July 14, 1970 R. C. HENSLEY ET AL 3,520,224
RETAINING PIN
Filed Feb. 12, 1969 2 Sheets-Sheet 1

INVENTORS
RUSTON C. HENSLEY
ELBERT J. LUCAS

*Richards, Harris & Hubbard*

ATTORNEY

INVENTORS
RUSTON C. HENSLEY
ELBERT J. LUCAS

ATTORNEY

United States Patent Office 3,520,224
Patented July 14, 1970

3,520,224
RETAINING PIN
Ruston C. Hensley and Elbert J. Lucas, Dallas, Tex.,
 assignors to Hensley Equipment Company, Inc., Dallas,
 Tex., a corporation of Texas
Filed Feb. 12, 1969, Ser. No. 798,656
Int. Cl. F16b 19/00
U.S. Cl. 85—8.3                                10 Claims

ABSTRACT OF THE DISCLOSURE

A retaining pin for securing digging teeth to the adapters of earth moving machines. The pin is comprised of a sandwich of two steel members and a rubber member positioned between the steel members. The pin is symmetrical and can therefore be inserted or removed from either the top or the bottom of a digging tooth. The pin can, however, be inserted and removed only by hammering solely on a particular one of the steel members. This prevents accidental displacement of the pin.

BACKGROUND OF THE INVENTION

Earth moving machines, such as diggers, trenchers, and the like, are typically provided with replaceable digging teeth. Usually the teeth are secured to the machines by retaining pins which extend through aligned holes in the teeth and the machines. Heretofore, two retaining pin types have been employed. The first type is comprised of a pair of tapered pins separated by a block of rubber. The second type is comprised of an indented pin in combination with a resilient or resiliently urged detent on the earth moving machines.

Neither of these retaining pin types has proven wholly satisfactory. The first type can only be removed by driving it in a direction opposite to its insertion direction. This is often difficult to accomplish in the field. The detents which retain the second retaining pin type are often worn or otherwise broken away. When this occurs the entire earth moving machine is disabled for the period of time necessary to repair the detent. Accordingly, a need exists for a retaining pin that is removed by driving it in its insertion direction and in which the pin retaining components are mounted on the pin.

SUMMARY OF THE INVENTION

In the preferred embodiment a retaining pin is comprised of a pair of rigid members separated by a body of resilient material and is characterized by inwardly tapered surfaces at the ends of one of the rigid members and projections at the ends of the other rigid member. Preferably, the pin is symmetrical about a transverse line extending through its longitudinal center.

DESCRIPTION OF THE DRAWINGS

A more complete understanding of the invention may be had by referring to the following detailed description when taken in conjunction with the drawings, wherein.

DETAILED DESCRIPTION

Figure 1:
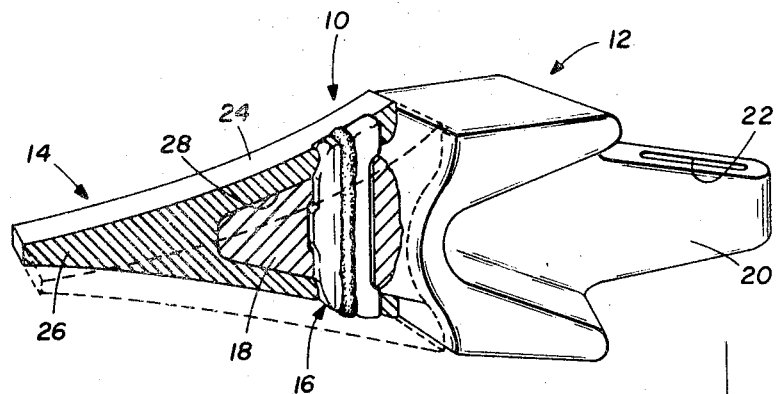
FIG. 1 is a perspective view of a retaining pin employing the invention, showing the retaining pin in use.

Referring now to the drawings, and referring particularly to FIG. 1 thereof, there is shown a replaceable digging tooth 10 of the type commonly employed on earth moving machines such as diggers, trenchers and the like. The assembly 10 is comprised of an adapter 12 and a digging tooth 14. The digging tooth 14 is replaceably secured on the adapter 12 by a retaining pin 16 which extends through aligned holes in the tooth 14 and the adapter 12.

The adapter 12 is comprised of a wedge-shaped nose 18 and a shank 20 extending rearwardly therefrom. The shank 20 is provided with an attachinig slot 22 by means of which the adapter 12 may be secured to an earth moving machine. The tooth 14 is comprised of a housing 24 and a tip or point 26 extending forwardly therefrom. A cavity 28 having an internal configuration similar to the external configuration of the nose 18 is formed in the housing 24 for purposes of mating the tooth 14 and the adapter 12. The tip 26 may be of any desired shape depending upon the particular earth moving function to be performed.

Figure 2:
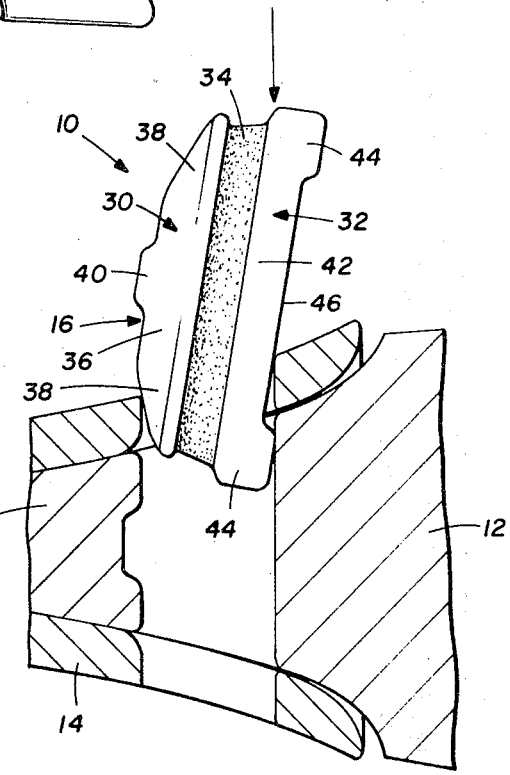
FIGS. 2-6 are progressive views illustrating the insertion and removal of the retaining pin shown in FIG. 1.

Referring now to FIG. 2, the details of the retaining pin 16 are shown. The pin 16 comprises a sandwich including two rigid members 30 and 32 and a resilient member 34 positioned between the rigid members. The rigid members 30 and 32 are formed from high strength alloy steel. The resilient member 34 is formed from 50 to 90 durometer neoprene rubber and is bonded to the rigid members 30 and 32 by heating the rubber sufficiently to cause it to adhere directly to the rigid members.

The rigid member 30 is comprised of a wide portion 36 and tapered portions 38 which extend from the ends of the wide portion 36 toward the ends and the center of the retaining pin 16. A detenting projection 40 extends outwardly from the wide portion 36 of the rigid member 30.

The rigid member 32 includes a main portion 42 and a pair of projections 44 which extend outwardly from the main portion 42 at the ends of the rigid member 32. The projections 44 form the ends of a cutaway portion 46 in the rigid member 32 which extends between points positioned opposite the tapered portions 38 of the rigid member 30.

The rigid member 30, the rigid member 32 and the resilient member 34 are each symmetrical about transverse lines extending through their longitudinal centers. Accordingly, the entire retaining pin 16 is symmetrical about a transverse line extending through its longitudinal center.

Insertion of the retaining pin 16 into the assembly 10 is begun by manually inserting the pin 16 into the tooth 14 as far as it will go. The retaining pin 16 is then positioned as shown in FIG. 2. The pin 16 is then hammered straight down in the manner indicated by the arrow in FIG. 2 until the upper projection 44 of the rigid member 32 is engaged with the tooth 14 of the assembly 10. The pin 16 is then positioned as shown in FIG. 3.

Figure 3:
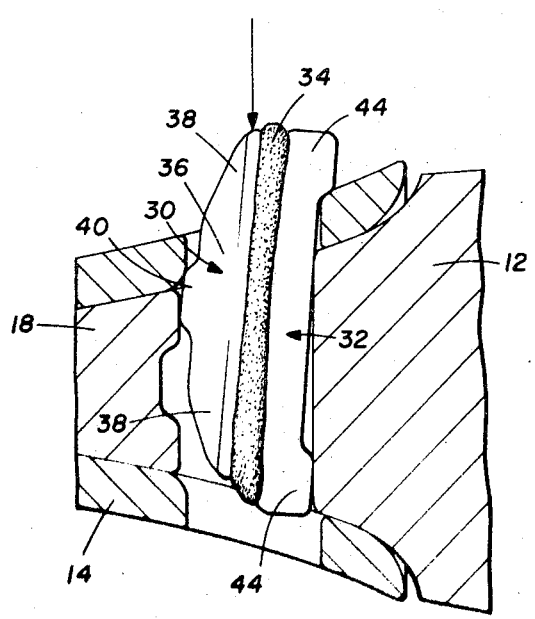

After the pin 16 is positioned as shown in FIG. 3, the rigid member 30 only is hammered downwardly in the manner indicated by the arrow in FIG. 3. This action is continued until the rigid portion 30 is fully seated in the assembly 10. At this point the components of the retaining pin 16 are positioned as shown in FIG. 4.

Figure 4:
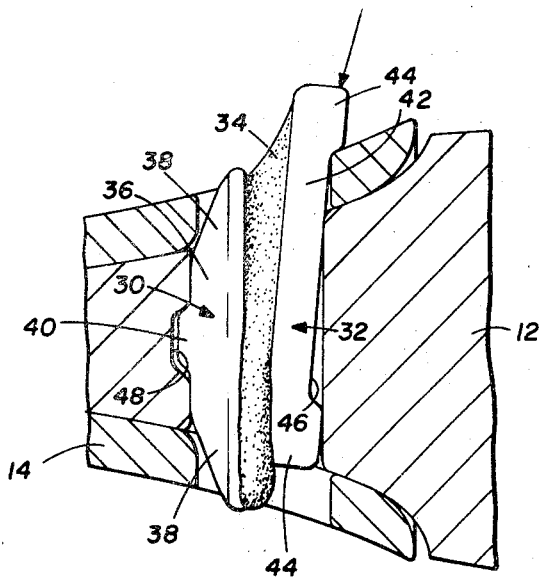

After the rigid member 30 is fully seated, the rigid member 32 is hammered down and forward in the manner indicated by the arrow in FIG. 4. This action, together with the resiliency of the resilient portion 34 seats the rigid member 32 in the assembly 10. The retaining pin 16 is then fully seated in the assemly 10 in the manner shown in FIG. 5.

The unique shape of the components of the retaining pin 16 results in several important relationships between the components of the assembly 10 when the retaining pin 16 is fully seated. First, the detenting projection 40 of the rigid member 30 is positioned in recess 48 formed in the interior of the nose 18 of the adapter 12. Second, the wide portion 36 of the rigid member 30 has a length substantially equal to the thickness of the nose 18 at the point of engagement of the rigid portion 30 with the nose 18. Therefore, the rigid member 30 is positioned in engagement with the adapter 12 of the assembly 10 but does not engage the tooth 14 thereof.

Finally, the projections 44 of the rigid portion 32 are separated by a distance substantially equal to the thickness of the cavity 28 formed in the housing 24 of the tooth 14 at the point of engagement of the rigid member 32 with the tooth 14. That is, the cutaway 46 formed in the main portion 42 of the rigid member 32 is substantially as long as the thickness of the nose 18 of the adapter 12 adjacent the rigid portion 32. Thus, the rigid portion 32 is positioned in engagement with the tooth 14 and out of engagement with the adapter 12.

The engagement of the rigid portion 30 solely with the adapter 12 and the engagement of the rigid portion 32 solely with the tooth 14 tends to urge the tooth 14 onto the adapter 12 under the action of the resiliency of the resilient member 34. This action tends to maintain a snug engagement between the tooth 14 and the adapter 12 even after considerable wear of the tooth 14. It should be realized however, that the rigid member 30 extends under portions of the tooth 14 and that the rigid member 32 extends over portions of the adapter 12. Thus, the rigid members 30 and 32 aid the detenting projection 40 in retaining the retaining pin in the assembly 10.

Figure 5:
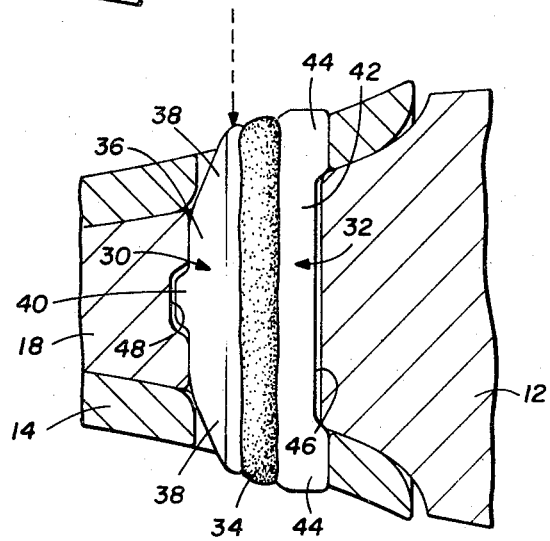

The retaining pin 16 is removed from the assembly 10 by hammering the rigid member 30 only downwardly in the manner indicated by the dashed arrow in FIG. 5. This action moves the detenting projection 40 out of the recess 48 and moves the upper projection 44 of the rigid member 32 into the adapter 12. At this point the retaining pin 16 is positioned as shown in FIG. 6.

Figure 6:
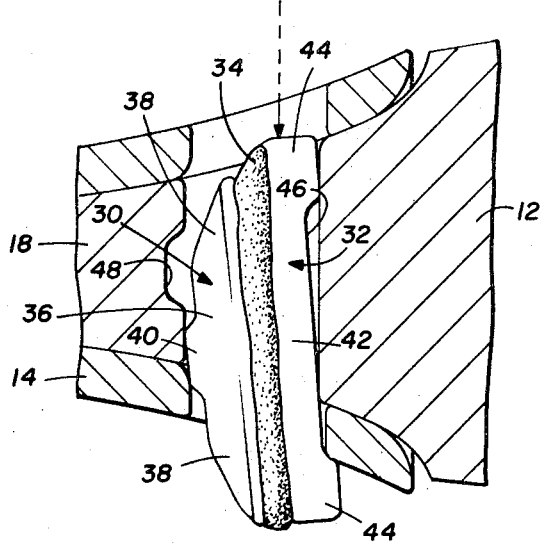

When the lower projection 44 of the rigid member 32 is clear of the tooth 14, the rigid member 32 is hammered downwardly in the manner indicated by the dashed arrow in FIG. 6. This action is continued until the retaining pin 16 is completely removed from the assembly 10.

The unique configuration of the components of the retaining pin 16 results in several advantages of the retaining pin 16 shown in the drawings over prior constructions. First, because of its symmetrical shape, the retaining pin shown can be inserted into the assembly 10 and removed therefrom from either direction. This is very advantageous in the field where it is often difficult to gain access to the retaining pin from one or the other of its top and bottom. Also, the pin 16 can only be re-removed by striking the rigid member 30 solely and cannot be removed by striking the two rigid members simultaneously. This tends to prevent accidental displacement of the retaining pin 16 from the assembly 10. That is, because it is unlikely that the rock or other object striking the retaining pin 16 would strike the rigid member 30 solely, and would certainly not tend to hammer repeatedly solely on the rigid member 30, the retaining pin 16 tends to resist accidental displacement in the field. Finally, all of the pin retaining components of the pin 16 are located on the pin. It has been found that the retaining pin shown in the drawings can be inserted and removed from digging tooth assemblies between 30 and 40 times without damage. Nevertheless, it is possible for any component of heavy equipment such as earth-moving machines to become damaged in use. In such an event, the retaining pin 16 is simply removed and discarded. Another retaining pin is then substituted for the damaged pin without disabling the earth moving machine.

Although only one embodiment of the invention is shown in the drawings and described in the foregoing specification, it will be understood that the invention is not limited to the embodiment disclosed but is capable of rearrangement, modification and substitution of parts in elements without departing from the spirit of the invention.

What is claimed is:
1. A retaining pin for securing a digging tooth to an earth moving machine adapter comprising:
   a body of resilient material;
   a first member attached to the body of resilient material and having a pair of projections extending from it that are spaced apart more than the thickness of the adapter, and
   a second member attached to the body of resilient material and having a single projection extending from it that is substantially as long as the thickness of the adapter and that extends to inwardly tapering surfaces which extend along the second member from the ends of the projection to the ends of the retaining pin.
2. The retaining pin according to claim 1 wherein the body of resilient material, the first member and the second member are each symmetrical about a line extending transversely through the center of the retaining pin.
3. The retaining pin according to claim 1 further including a detenting projection extending from the single projection on the second member.
4. A tooth retaining pin adapted for use with tooth receiving adapters of predetermined thickness and comprising a sandwich formed from a pair of rigid members and a resilient member positioned between the rigid members, wherein the improvement comprises:
   a pair of similar generally tapered surfaces on one of the rigid members that extend from the ends of the member to a wide portion thereof which extends in one direction relative to the retaining pin and which has a length substantially equal to the predetermined thickness;
   a cutaway portion on the other of the members that extends between projections on the member and which projections and cutaway portion extend from points opposite the tapered surfaces, with said projections extending in a direction opposite to the one direction, and
   a projection extending in the one direction from the wide portion on one of the rigid members at a point between the tapered surfaces and a cooperating recess formed in the adapter.
5. The retaining pin according to claim 4 further characterized in that the rigid members and the resilient member are all elongate in shape and are all symmetrical about a transverse axis extending through the longitudinal center of the retaining pin.
6. A retaining pin for locking digging teeth on earth moving machine adapters having a predetermined thickness comprising:
   a first member having a predetermined overall length, having a wide portion substantially equal in length to the thickness of the adapter and having tapered portions extending from each end of the wide portion;
   a second member having an overall length substantially equal to the length of the first member and having a pair of projections extending from it at points spaced apart more than the thickness of the adapter, and
   resilient means positioned between the first and second members.
7. The retaining pin according to claim 6 wherein the first and second members are positioned on opposite sides of the resilient means, wherein the wide portion extends outwardly from the first member in a plane extending through the two members and the resilient means and wherein the projections extend outwardly from the second member in the same plane.
8. The retaining pin according to claim 7 wherein the tapered surfaces are positioned in the plane and extend toward the resilient means and toward the ends of the first member.
9. The retaining pin according to claim 8 wherein the first and second members and the resilient means are all symmetrical about a line positioned in the plane and extending through the longitudinal center of the retaining pin.

10. The retaining pin according to claim 9 further including a detenting projection extending from the wide portion in the plane and wherein the adapter has a recess formed in it for cooperation with the detenting projection to secure the retaining pin in the adapter.

References Cited

UNITED STATES PATENTS

| | | | |
|---|---|---|---|
| 2,702,490 | 2/1955 | Launder. | |
| 2,772,492 | 12/1956 | Murtaugh | 85—8.3 XR |
| 2,870,667 | 1/1959 | Murtaugh. | |
| 2,949,687 | 8/1960 | Peklay et al. | 85—8.3 XR |

FOREIGN PATENTS 1,074,329  1/1960  Germany.

DAVID J. WILLIAMOWSKY, Primary Examiner

A. V. KUNDNAT, Assistant Examiner

U.S. Cl. X.R.

37—142; 287—53